(12) United States Patent
Salomonsson

(10) Patent No.: US 7,871,122 B2
(45) Date of Patent: Jan. 18, 2011

(54) CRASH BOX FOR A VEHICLE

(75) Inventor: Per Salomonsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 182 days.

(21) Appl. No.: 12/086,848

(22) PCT Filed: Jan. 15, 2007

(86) PCT No.: PCT/SE2007/000025

§ 371 (c)(1),
(2), (4) Date: Jun. 20, 2008

(87) PCT Pub. No.: WO2007/086787

PCT Pub. Date: Aug. 2, 2007

(65) Prior Publication Data

US 2009/0001737 A1    Jan. 1, 2009

(30) Foreign Application Priority Data

Jan. 24, 2006    (SE) .................................. 0600144

(51) Int. Cl.
*B60J 7/00* (2006.01)
(52) U.S. Cl. ................................. 296/187.03
(58) Field of Classification Search ............ 296/187.03, 296/37.12, 187.09; 293/155, 132, 133, 120, 293/102; 188/377
See application file for complete search history.

(56) References Cited

U.S. PATENT DOCUMENTS

| | | | |
|---|---|---|---|
| 4,190,276 A * | 2/1980 | Hirano et al. | 293/133 |
| 5,452,916 A * | 9/1995 | Beecher et al. | 280/777 |
| 6,474,709 B2 * | 11/2002 | Artner | 293/133 |
| 6,648,385 B2 * | 11/2003 | Frank | 293/133 |
| 6,672,438 B2 * | 1/2004 | Beck | 188/377 |
| 6,814,381 B1 * | 11/2004 | Frank | 293/133 |
| 6,863,321 B2 * | 3/2005 | Jonsson et al. | 293/102 |
| 6,926,325 B2 * | 8/2005 | Frank | 293/133 |
| 6,929,297 B2 * | 8/2005 | Muller et al. | 293/133 |
| 7,213,867 B2 * | 5/2007 | Haneda et al. | 296/132 |
| 7,252,314 B2 * | 8/2007 | Tamura et al. | 293/133 |
| 7,357,432 B2 * | 4/2008 | Roll et al. | 293/133 |
| 7,407,206 B2 * | 8/2008 | Arns et al. | 293/133 |
| 7,413,226 B2 * | 8/2008 | Muskos | 293/133 |
| 7,533,913 B2 * | 5/2009 | Bae | 293/133 |
| 7,543,537 B2 * | 6/2009 | Seitzberger et al. | 105/392.5 |

(Continued)

FOREIGN PATENT DOCUMENTS

DE    102004002948    8/2005

(Continued)

*Primary Examiner*—Kiran B. Patel
(74) *Attorney, Agent, or Firm*—Mark P. Stone

(57) ABSTRACT

A crash box consists of two U-profiles (18, 19) of sheet metal, the webs of which (21, 23 and 20, 22) overlap and are joined such that the crash box obtains a closed profile. The two joined sides (21, 23 and 20, 22) of the crash box have a number of transverse dents (26-33) with intermediate side areas (34-40) along their lengths. One web, or both webs, in one pair or in each pair of joined webs (21, 23 and 20, 22) has notches (50-54) in its edge in some of the dents (26-33) or in the intermediate areas (34-40), or both of these, as initiators of deformation.

20 Claims, 5 Drawing Sheets

U.S. PATENT DOCUMENTS

| | | | |
|---|---|---|---|
| 7,631,924 B2 * | 12/2009 | Nilsson | 296/133 |
| 2001/0013706 A1 | 8/2001 | Artner | |
| 2008/0098601 A1 * | 5/2008 | Heinz et al. | 29/897.2 |
| 2008/0224487 A1 * | 9/2008 | Wang et al. | 293/132 |
| 2009/0026777 A1 * | 1/2009 | Schmid et al. | 293/133 |
| 2009/0085362 A1 * | 4/2009 | Terada et al. | 293/132 |
| 2009/0115208 A1 * | 5/2009 | Kano et al. | 293/132 |
| 2009/0261602 A1 * | 10/2009 | Karlander | 293/132 |

FOREIGN PATENT DOCUMENTS

| | | |
|---|---|---|
| EP | 1477371 | 11/2004 |
| EP | 1640224 | 3/2006 |
| WO | 2005 120903 | 12/2005 |

* cited by examiner

CRASH BOX FOR A VEHICLE

TECHNICAL FIELD

The present invention relates to a crash box comprising two U-profiles of sheet metal that have their webs overlapping and attached to each other such that the box obtains a closed profile, wherein the two sides of the crash box with joined webs have a number of transverse dents along their lengths.

BACKGROUND AND THE PRIOR ART

Bumper bars for vehicles are often mounted on crash boxes that are mounted at the ends of the side rails of the vehicle. EP 1 477 371 A2 shows a crash box of the type described above. This has grooves or dents on all of its four plane sides and holes at all of its four corner edges at the centre of the grooves, and these holes act as deformation initiators. An even loading curve is obtained, but the holes reduce the level of load since the corners have the greatest significance for the loading level.

AIM OF THE INVENTION AND BRIEF DESCRIPTION OF THE INVENTION

It is an object of the invention to achieve simply and cheaply the initiation of deformation that provides good deformation properties and a high absorption of energy while maintaining a high loading level. This is achieved through at least one of the webs of at least one of the pairs of joined webs having notches as initiators of deformation in its edge. It is particular, when the two sides of the crash box with joined webs have a number of transverse dents along their lengths, it is advantageous to have such notches in the centre portion of the dents and/or in the centre portions of the portions intermediate the dents.

The invention has been given the characteristics that are defined in the claims.

DESCRIPTION OF ILLUSTRATED AND PREFERRED EMBODIMENT

Figure 1:
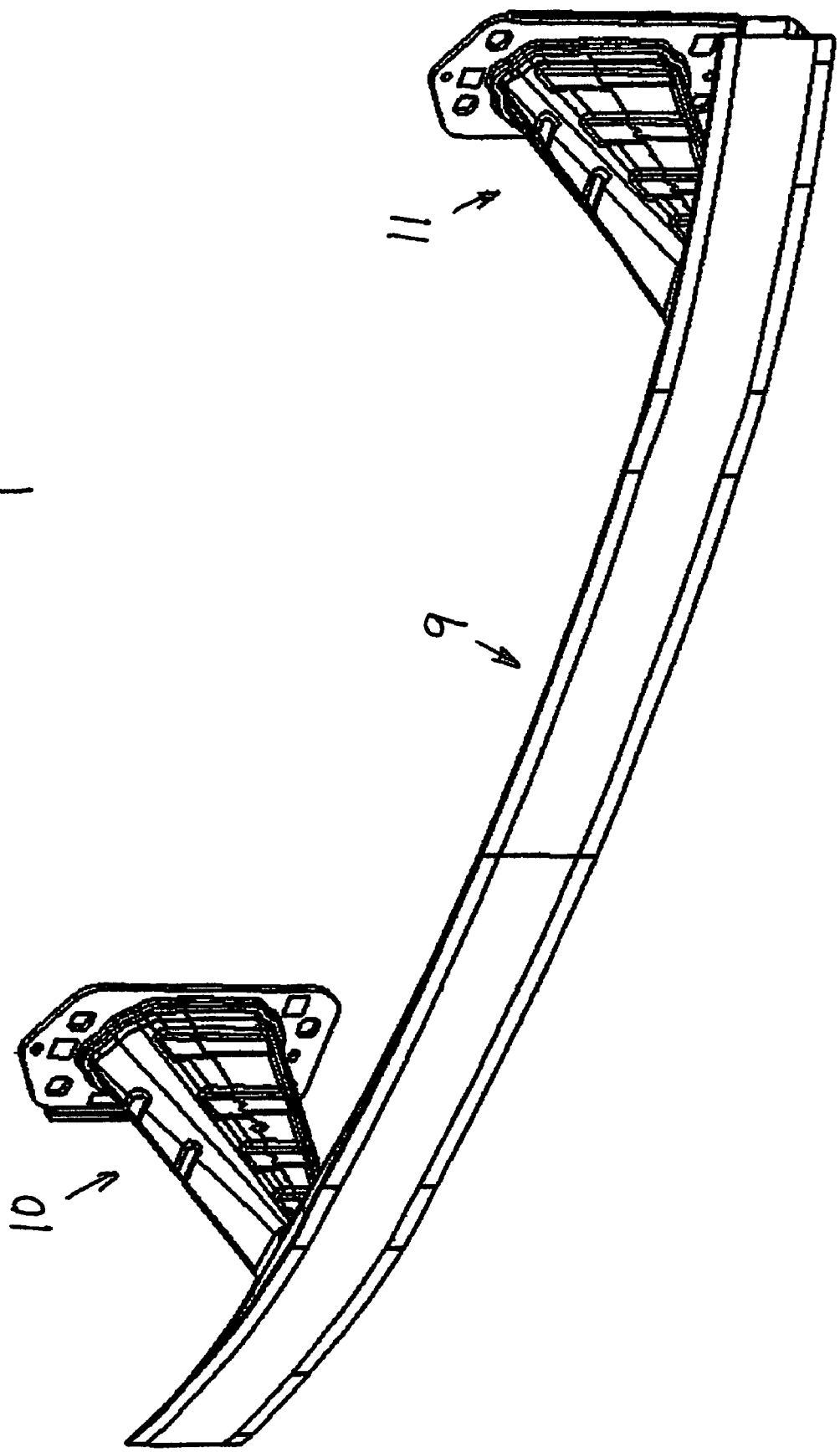
FIG. 1 is a perspective view of two crash boxes according to the invention with a bumper beam mounted.
Figure 2:
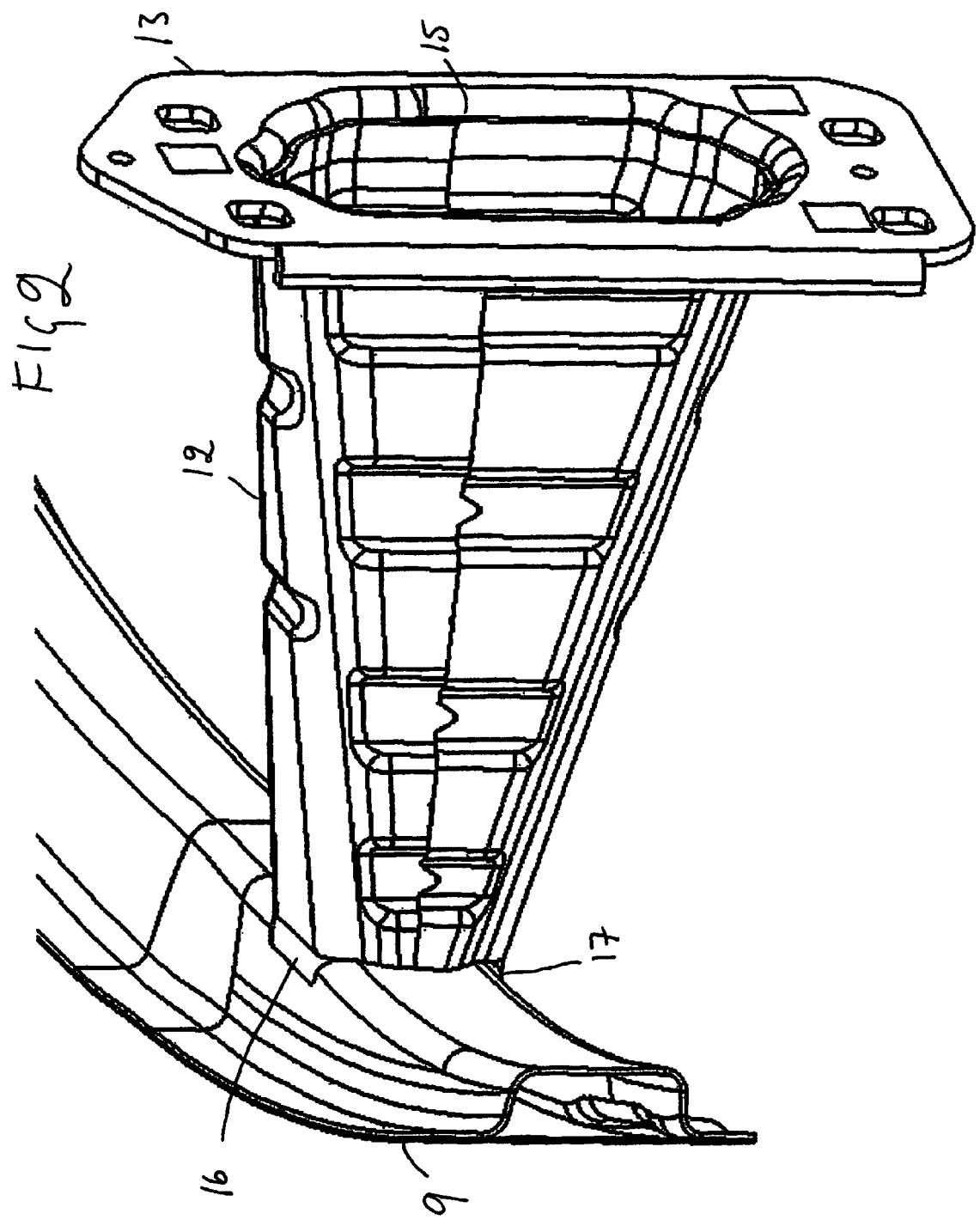
FIG. 2 shows a perspective view from behind of one crash box and a part of the bumper beam.

FIG. 1 shows a bumper beam 9 that is supported by two crash boxes 10, 11. FIG. 2 shows one 11 of the crash boxes that consists of an open box 12 and an attachment plate 13. The attachment plate has a hole with an edge 15 that has been folded up. The open box is mounted on this edge and welded in place. It is intended that the attachment plate be attached to a supporting part of the vehicle, usually against the end of one side rails of the vehicle. The second end of the hollow box is adapted to the form of the bumper beam 9 and has attachment tabs 16, 17 welded to the bumper beam. The cross-section of the box changes continuously from the attachment plate 13 to the attachment tabs 16, 17.

Figure 3:
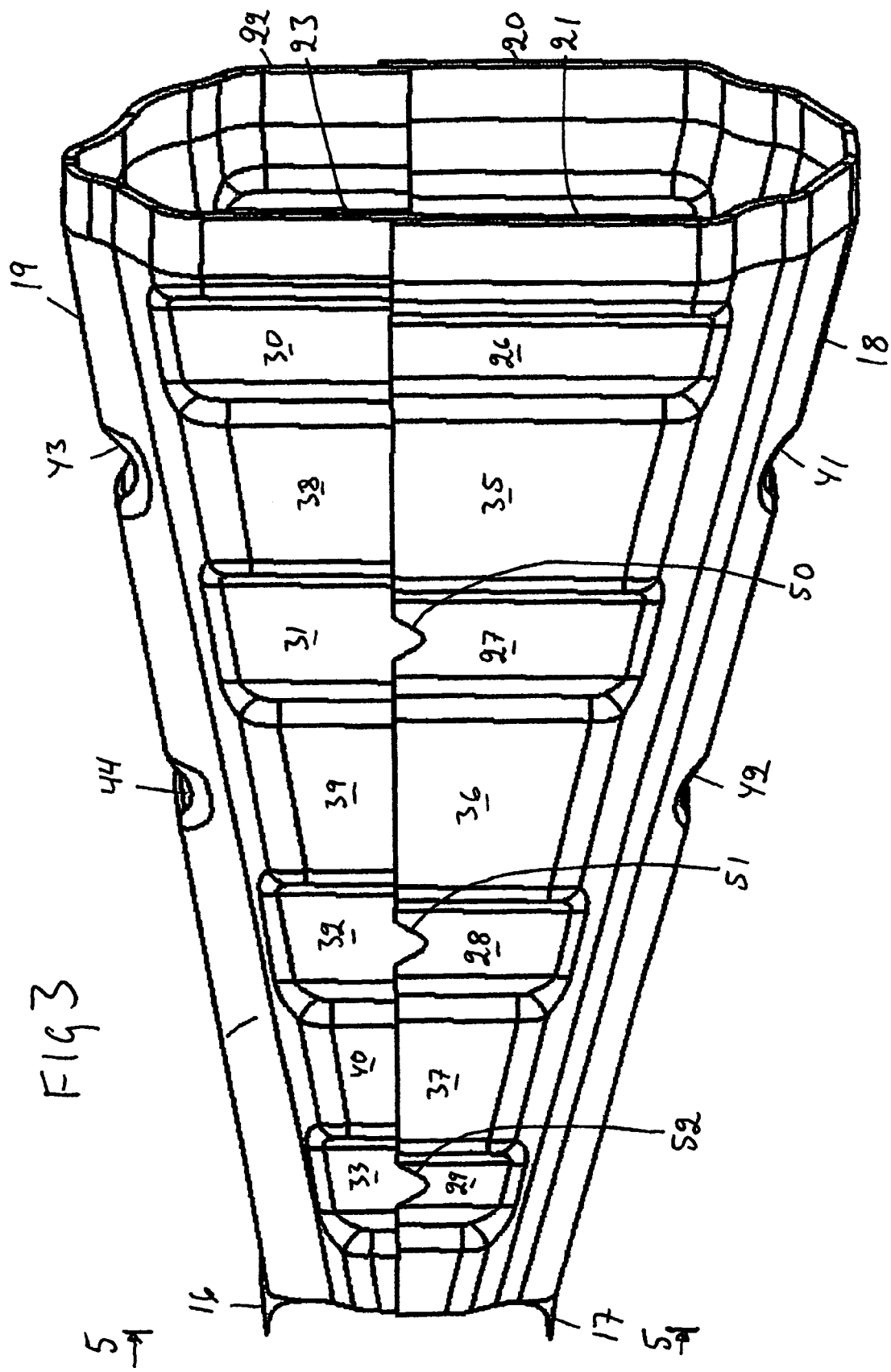
FIG. 3 shows the crash box without an end plate as is shown in FIG. 1.
Figure 4:
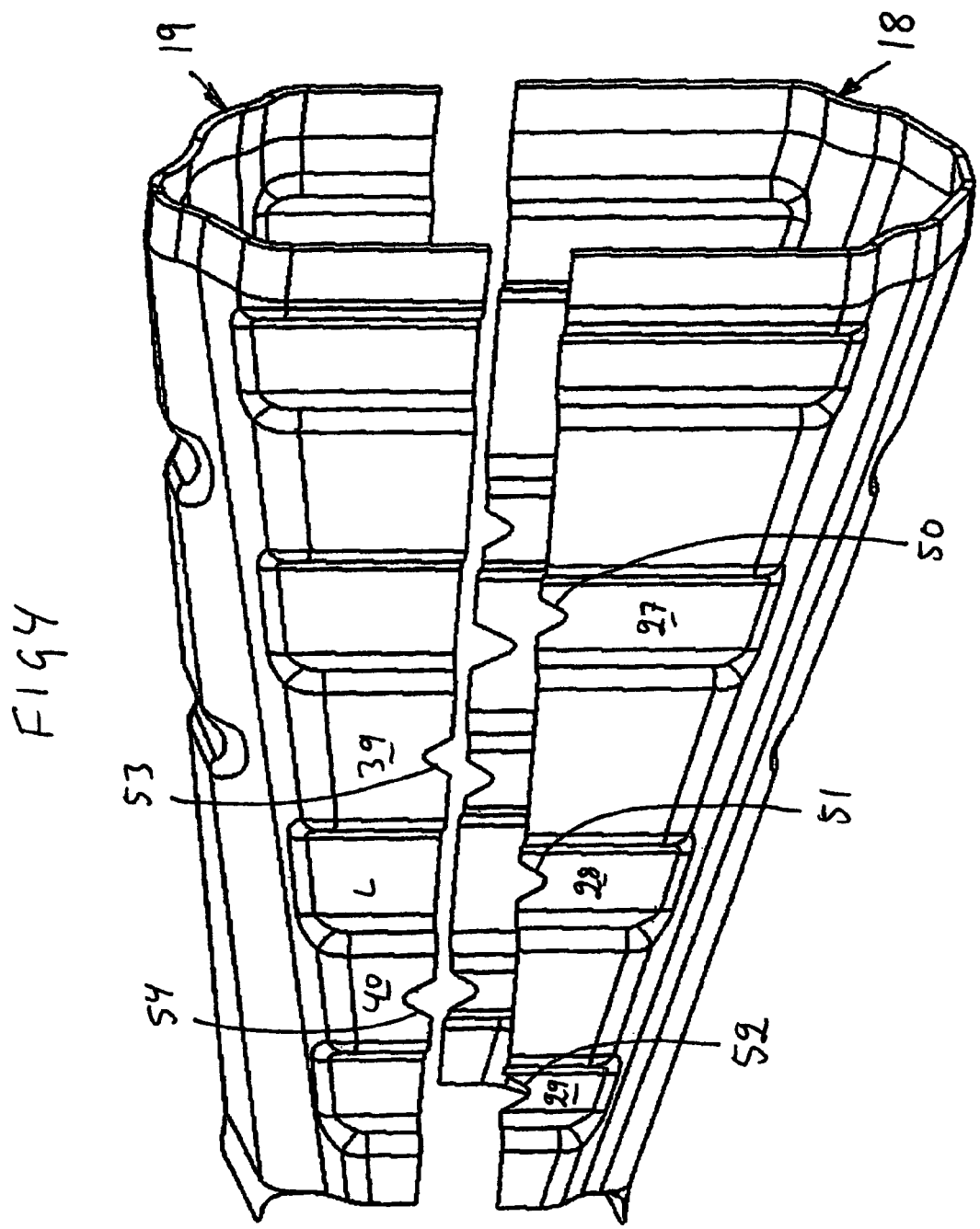
FIG. 4 shows two U-profiles that when combined form the crash box that is shown in FIG. 2.

FIG. 4 shows the box 12, which consists of a lower U-profile 18 and an upper U-profile 19 that are shown in FIG. 3 welded together to form the box. The profiles 18, 19 have been cold-formed from sheet metal, and it is appropriate that high strength sheet steel be used. The webs 20, 21 and 22, 23 of these profiles have a number of transverse dents or grooves 26-29 and 30-33, respectively, with intermediate areas 35-37 and 38-40, respectively.

Figure 5:
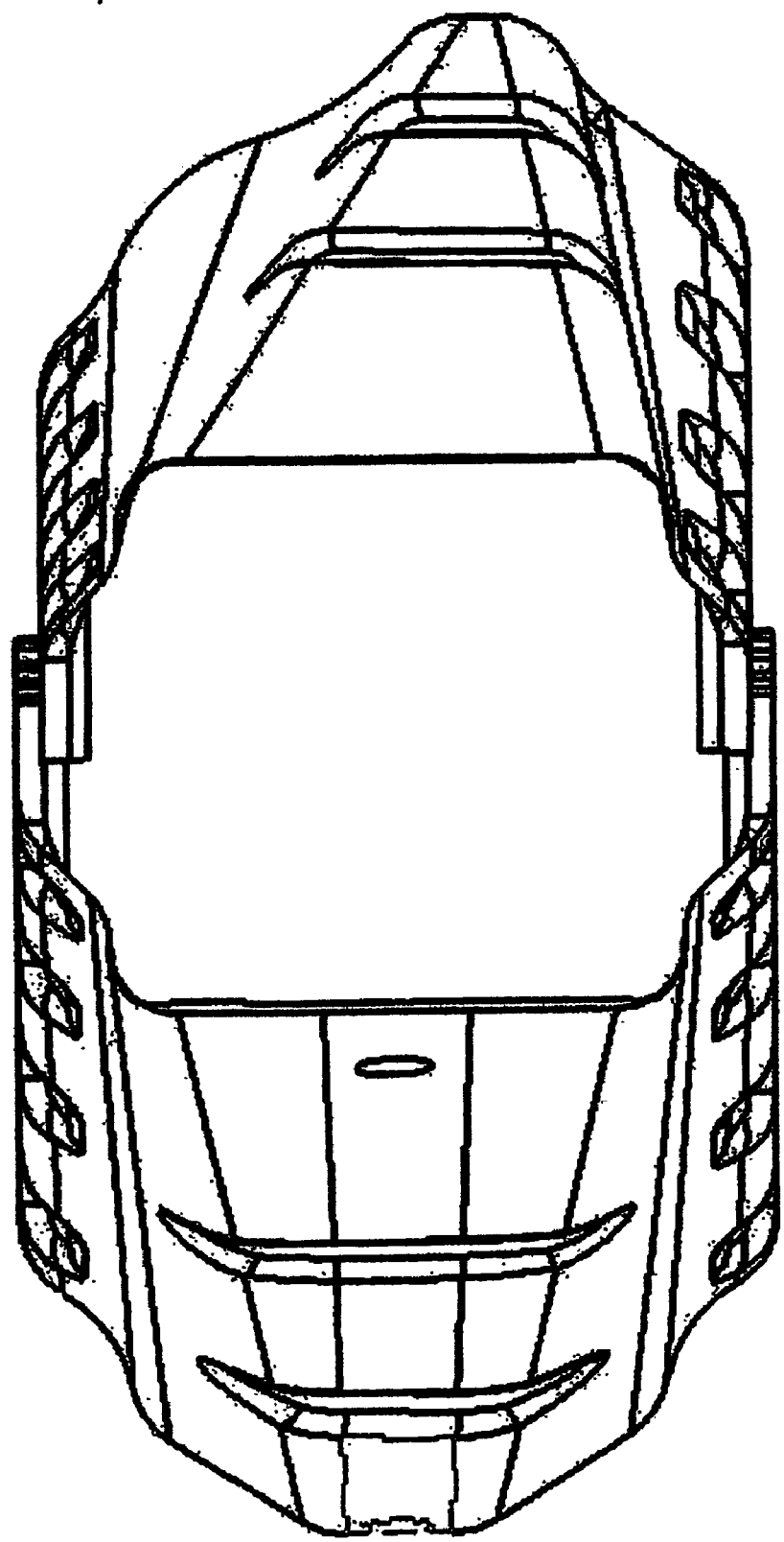
FIG. 5 is an end view seen as is specified by the arrows 5-5 in FIG. 3.

It is desired that each dent in the web is to give rise to one fold inwards, that each intermediate area is to give rise to one fold outwards, and that the formation of folds is to begin closest to the bumper beam where the cross-section has its smallest perimeter, as is shown in FIG. 5. The cross-section increases continuously, as can be seen in the drawing, from the end at the bumper beam to the end at which the hollow box is attached to the vehicle. It is possible to have dents 41-44 also in the top and bottom, that is, in the central flanges of the two U-profiles. These dents may be positioned between the side dents, as shown in FIG. 3, in order to initiate folds inwards where the side dents initiate folds outwards.

The longitudinal edges of the two U-profiles have notches or cuts for fine adjustment of the initiation of deformation. Triangular notches 50, 51, 52 are shown in FIGS. 3 and 4 in the side 21 of the lower U-profile in the centres portions of the dents 27, 28, 29. Notches 53, 54 are shown also in FIG. 4 in the side 23 of the upper U-profile 19 in the centre portions of the areas 39, 40 between the dents. The other profile sides have equivalent notches. Usually, the hollow box is symmetrical with dents and pointed notches that are arranged symmetrically, but asymmetry may be desired in certain cases either for adaptation to an asymmetric side rail on the vehicle, or in order to compensate for an expected asymmetrical loading in a collision, or for both of these effects. FIG. 5 shows that the end of the hollow box 12 that faces the attachment plate has an asymmetric top. The second crash box 10 is in this case a mirror image of the crash box 11.

The notches 50-54 improve the initiation of deformation without giving a significant decrease in the loading level that the crash box absorbs by its deformation. The notches may be placed, as is shown in the drawings, solely on the overlapping parts of the webs such that the crash box does not possess visible holes. The notches are shown as triangular pointed notches. It is not a requirement that they be pointed: they may alternatively have another shape and they may, for example, have an elliptical shape or they may be cuts without the removal of material.

The invention claimed is:

1. A crash box comprising two U-profiles (18, 19) of sheet metal, the webs of which (21, 23 and 20, 22) overlap and are joined such that the crash box obtains a closed profile, characterised in
that at least one web in at least one of the pairs of joined webs (21, 23 and 20, 22) has notches (50, 54) in its longitudinal edge as initiators of deformation.

2. A crash box as defined in claim 1, characterised in that the two sides of the crash box with joined webs (21, 23 and 20, 22) have a number of transverse dents (26-33) and intermediate side areas (34-40) along their lengths and said notches (50-52) are positioned in at least some of the dents.

3. A crash box as defined in claim 1, characterised in that the two sides of the crash box with joined webs (21, 23 and 20, 22) have a number of transverse dents (26-33) and intermediate side areas (34-40) along their lengths and said notches (53, 54) are positioned in at least some of said intermediate areas.

4. A crash box as defined in claim 2, characterised in that the notches (50-54) are positioned in the centre position of said dents or intermediate areas, respectively.

5. A crash box as defined in claim 1, characterised in that the central flange between the webs of at least one of the U-profiles has transverse dents (43, 44) positioned between the dents of the webs.

6. A crash box as defined in claim 1, characterised in that the edges of all four webs (20-23) have notches (50-54).

7. A crash box as defined in claim 2, characterised in that the two sides of the crash box with joined webs (21, 23 and 20, 22) have a number of transverse dents (26-33) and intermediate side areas (34-40) along their lengths and said notches (53, 54) are positioned in at least some of said intermediate areas.

8. A crash box as defined in claim 3, characterised in that the notches (50-54) are positioned in the centre position of said dents or intermediate areas, respectively.

9. A crash box as defined in claim 2, characterised in that the central flange between the webs of at least one of the U-profiles has transverse dents (43, 44) positioned between the dents of the webs.

10. A crash box as defined in claim 7, characterised in that the notches (50-54) are positioned in the centre position of said dents or intermediate areas, respectively.

11. A crash box as defined in claim 7, characterised in that the central flange between the webs of at least one of the U-profiles has transverse dents (43, 44) positioned between the dents of the webs.

12. A crash box as defined in claim 8, characterised in that the central flange between the webs of at least one of the U-profiles has transverse dents (43, 44) positioned between the dents of the webs.

13. A crash box according to claim 2, characterised in that the edges of all four webs (20-23) have notches (50-54).

14. A crash box according to claim 3, characterised in that the edges of all four webs (20-23) have notches (50-54).

15. A crash box according to claim 4, characterised in that the edges of all four webs (20-23) have notches (50-54).

16. A crash box according to claim 5, characterised in that the edges of all four webs (20-23) have notches (50-54).

17. A crash box according to claim 7, characterised in that the edges of all four webs (20-23) have notches (50-54).

18. A crash box according to claim 8, characterised in that the edges of all four webs (20-23) have notches (50-54).

19. A crash box according to claim 9, characterised in that the edges of all four webs (20-23) have notches (50-54).

20. A crash box according to claim 10, characterised in that the edges of all four webs (20-23) have notches (50-54).

* * * * *